Figure 1:
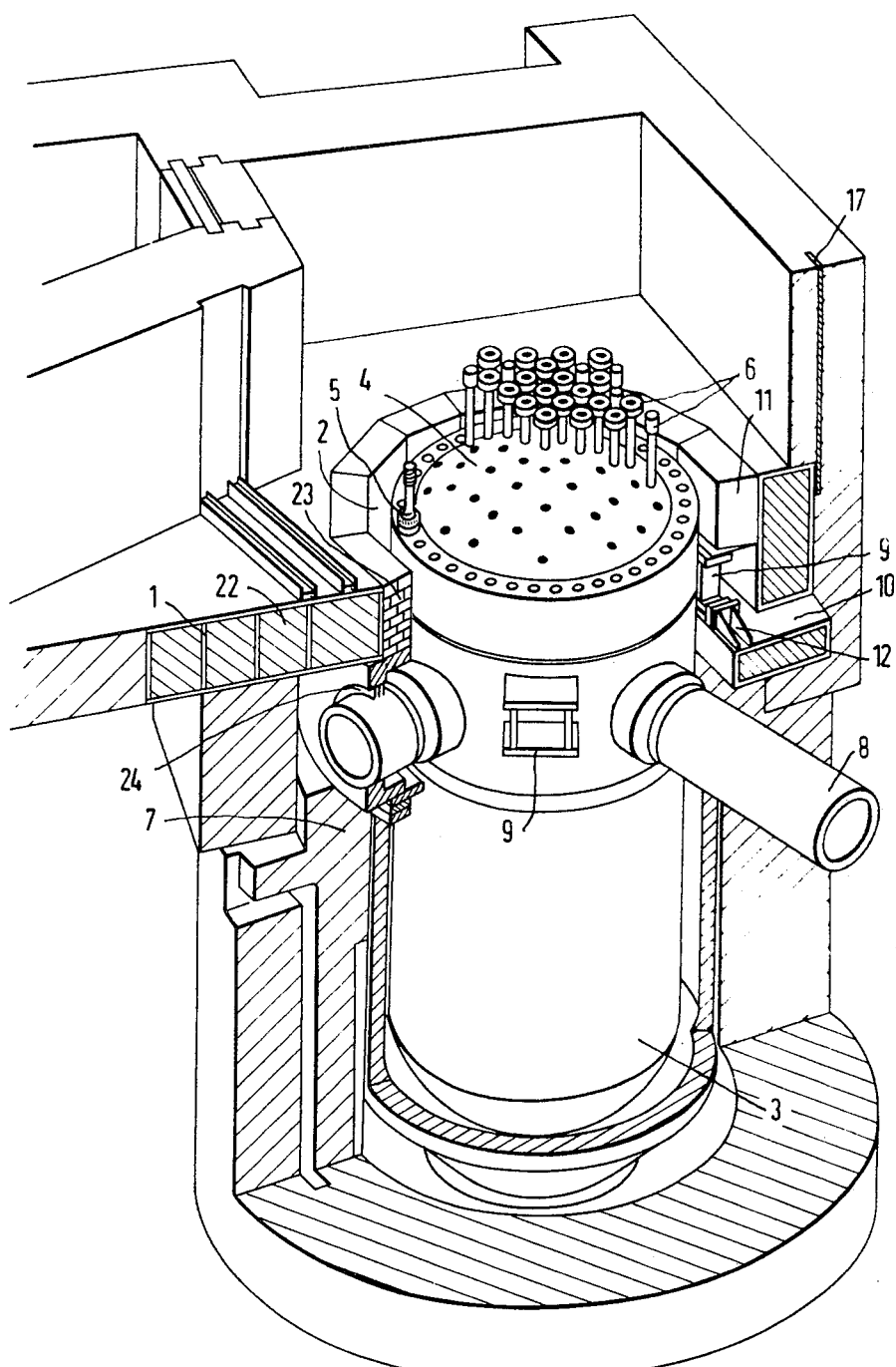

United States Patent [19]
Scholz et al.

[11] 3,775,250
[45] Nov. 27, 1973

[54] DEVICE FOR SUSPENDING AND SUPPORTING A REACTOR PRESSURE VESSEL IN A NUCLEAR POWER PLANT

[75] Inventors: Manfred Scholz, Erlangen, Germany; Friedrich Wakonig, Graz, Austria

[73] Assignee: Siemens Aktiengesellschaft, Berlin and Munich, Germany

[22] Filed: Mar. 17, 1971

[21] Appl. No.: 125,132

[52] U.S. Cl.................. 176/87, 248/146, 176/38
[51] Int. Cl............................................. G21c 13/02
[58] Field of Search...................... 176/87, 38, 37; 248/146; 137/376

[56] References Cited
UNITED STATES PATENTS

| | | | |
|---|---|---|---|
| 3,583,429 | 6/1971 | Desmarchais........................ | 176/87 |
| 3,395,076 | 7/1968 | Ruppen, Jr. ......................... | 176/38 |
| 3,123,328 | 3/1964 | Trickett et al. ....................... | 176/87 |
| 3,578,564 | 5/1971 | Fletcher............................... | 176/87 |
| 2,890,009 | 6/1959 | Chapellier........................... | 176/87 |

FOREIGN PATENTS OR APPLICATIONS

| | | | |
|---|---|---|---|
| 942,259 | 11/1963 | Great Britain........................ | 176/87 |
| 897,445 | 5/1962 | Great Britain........................ | 176/87 |

*Primary Examiner*—Harvey E. Behrend
*Attorney*—Curt M. Avery, Arthur E. Wilfond, Herbert L. Lerner and Daniel J. Tick

[57] ABSTRACT

Device for suspending and supporting a reactor pressure vessel in a reactor chamber of a nuclear power plant includes a cover for the reactor chamber formed with an opening through which the pressure vessel extends into the reactor chamber, the cover being of compartment-shaped steel construction, support paws extending from the outer surface of the reactor pressure vessel, and support brackets located below the cover and secured thereto so as to form a structural entity therewith, the support paws being supported on the support brackets.

5 Claims, 2 Drawing Figures

DEVICE FOR SUSPENDING AND SUPPORTING A REACTOR PRESSURE VESSEL IN A NUCLEAR POWER PLANT

Our invention relates to device for suspending and supporting reactor pressure vessels in nuclear power plants.

In the heretofore known constructions of such devices, the reactor pressure vessel was usually supported on a biological shield surrounding the pressure vessel by means of a carrier ring located below the coolant supply and discharge lines for the reactor. This carrier ring was constructed so that the operating weight of the pressure vessel, as well as the pipeline reaction forces, can be absorbed and simultaneously transmitted to the biological shield.

Such a support by means of a carrier ring has various disadvantages, however. Thus, due to γ-ray heating of the biological shield and the thermal expansion associated therewith, the pressure vessel is supported very uneasily and uncertainly. This inevitably produces greater stress in the main cooling system. In addition, displacement or shifting of the pressure vessel can occur if the ground settles, and the pressure vessel can only be restored to its original position with great difficulty when it is supported by a carrier ring. A further essential viewpoint with respect to technical reliability is the displacement or shifting of the pressure vessel due to the worst possible accident or mishap that might be assumed, namely which may occur generally if a break were to take place in one of the main coolant pipelines in the vicinity of the junction or union chamber. In that event, a pressure build-up occurs in the reactor pit or chamber below the pressure vessel, which tends to push the pressure vessel axially upwardly. Due to the coolant escaping from the broken line, axially, radially or tangentially directed reaction forces are produced, depending upon the location and type of break in the pipeline. In order to hold the pressure vessel down securely in the event of such a mishap, considerable expense is required for auxiliary connecting members, on the one hand, between the pressure vessel and the carrier ring and, on the other hand, as well between the carrier ring and the biological shield, in order also to keep the pressure vessel in the position thereof at the onset of the aforementioned forces.

In addition to the reaction forces occurring at the pressure vessel, the escaping coolant also effects a pressure build-up between the junction or union chamber and the reaction chamber, which must be absorbed by the cover of the reactor chamber.

It is accordingly an object of our invention to provide device for suspending and supporting a reactor pressure vessel in a nuclear power plant with which the pressure vessel is held or supported in a simple and reliable manner so that even during a mishap or accident, all forces that are produced are reliably controlled without any shifting of the pressure vessel or any other consequential damage.

With the foregoing and other objects in view, we provide in accordance with the invention, device for suspending and supporting a reactor pressure vessel in a reactor chamber of a nuclear power plant comprising a cover for the reactor chamber formed with an opening through which the pressure vessel extends into the reactor chamber, the cover being of compartment-shaped steel construction, support paws extending from the outer surface of the reactor pressure vessel, and support brackets located below the cover and secured thereto so as to form a structural entity therewith, the support paws being supported on the support brackets.

Consequently, the pressure vessel is no longer supported from below on the somewhat statically insecure biological shield but is rather suspended from above in the especially stable cover of the reactor chamber.

In accordance with another feature of the invention, to provide reliable absorption and limitation of the various forces acting on the pressure vessel, the support brackets are provided with stop members for limiting movement of the support paws of the pressure vessel tangentially to the peripheral surface of the pressure vessel.

In accordance with a further feature of the invention, brackets having stop members at the underside thereof for limiting movement of the pressure vessel in axial direction thereof are disposed above the support paws in the opening formed in the reactor chamber cover, the brackets being firmly connectible to the cover. By means of these additional brackets which are installed after the pressure vessel has been inserted, the possibility of the upward movement of the pressure vessel due to a break in a main coolant line and a consequent pressure build-up below the pressure vessel is reliably prevented.

In accordance with other features of the invention, the support paws for suspending and supporting the pressure vessel are located at the level at which the coolant supply and discharge lines are connected to the pressure vessel, and are disposed respectively at the periphery of the pressure vessel between these coolant lines. Another feature of the invention is the provision of adjusting plates or shims at the respective brackets for effecting an exact adjustment of the position of the pressure vessel. The shims permit a simple and accurate orientation of the pressure vessel after the assembly thereof. The heretofore required test assembly of the conventional carrier ring and pressure vessel, which was formerly necessary to effect an accurate fit before the final assembly thereof, is thereby dispensed with.

In accordance with an additional feature of the invention and to afford reliable absorption of all forces coming from the pressure vessel, depending upon the structural shape of the reactor building, the steel cover structure is suspended, for example by tie rods in three walls of the reactor building and is supported from below on a fourth wall of the reactor building whereon it is held down by a tie rod.

Other features which are considered as characteristic for the invention are set forth in the appended claims.

Although the invention is illustrated and described herein as embodied in device for suspending and supporting a reactor pressure vessel in a nuclear power plant, it is nevertheless not intended to be limited to the details shown, since various modifications and structural changes may be made therein without departing from the spirit of the invention and within the scope and range of equivalents of the claims.

Figure 2:
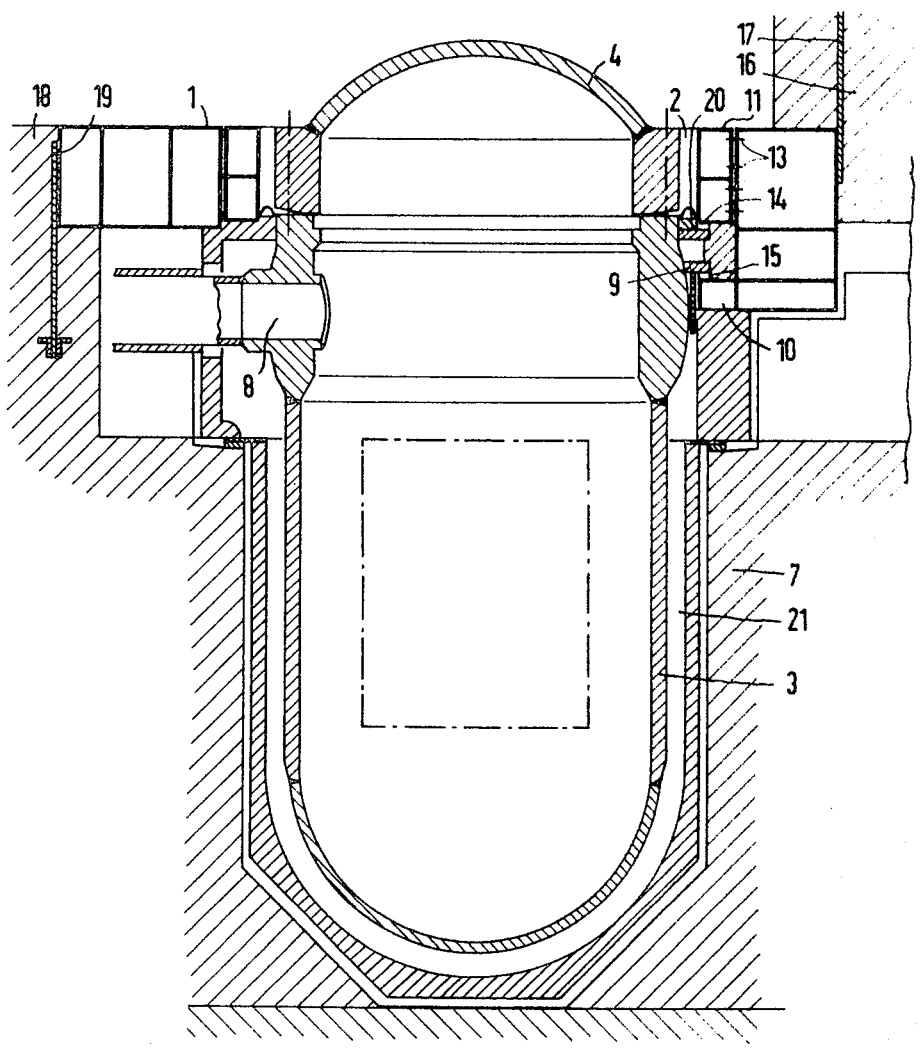

The construction and method of operation of the invention, however, together with additional objects and advantages thereof will be best understood from the following description of specific embodiments when read in connection with the accompanying drawing, in which:

FIG. 1 is a perspective view of a reactor structure according to the invention, partly cut away to show the pressure vessel therein; and FIG. 2 is a partly diagrammatic longitudinal section of the pressure vessel of FIG. 1 and the suspension therefor located at the cover of the reactor chamber.

Referring now to the drawing, there is shown in FIGS. 1 and 2 a cover 1 for a reactor chamber, the cover 1 having the construction of a compartment or box-shaped steel structure. The cover 1 is formed with a substantially circular opening 2 through which a reactor pressure vessel 3 is inserted into the reactor chamber. The pressure vessel 3 is closed by the cover 4, which is secured thereto by stud bolts 5, cover tubes 6 being provided at the upper side of the cover 4 for receiving thereon control rod drives for non-illustrated control rods extending through the cover tubes into the pressure vessel 3. The lower part of the pressure vessel 3, as viewed in the figures, is surrounded by a biological shield 7 on which, in the heretofore known state of the art, the pressure vessel 3 was formerly supported.

In accordance with the invention of the instant application, however, several support paws 9 are welded between coolant tubes 8 at the outer wall of the pressure vessel 3. These support paws 9 respectively abut a support bracket 10 which forms a unitary structure with the steel cover structure 1. Additional brackets 11 are located above the support paws 9 for holding down the pressure vessel 3 in the event of a mishap, the additional brackets 11 being rigidly connected to the cover structure 1. The support brackets 10 have, in addition, tangentially extending stop members 12 for limiting movement of the support paws 9 tangentially to the periphery of the cylindrical part of the pressure vessel 3.

The exact support or bearing system for the pressure vessel is apparent from the longitudinal sectional view of FIG. 2 taken through the pressure vessel 3 and the suspension system therefor. The reactor chamber cover 1 is increased in thickness downwardly as viewed in FIG. 2 by the support brackets 10 at those locations of the pressure vessel 3 at which the support paws 9 are, for example, welded to the pressure vessel 3. Thus, the respective support paws 9 are supported on the support brackets 10. An annular, relatively large gap of the opening 2 located between the pressure vessel 3 and the steel cover structure 1 originally so as to provide the necessary clearance to permit assembly for the reactor is subsequently closed above the support paws 9 by the additional brackets 11 which are secured to the cover structure 1, for example, by screws or bolts 13, shown diagrammatically in FIG. 2.

Accurate adjustment of the position of the pressure vessel 3 is then effected by adding or removing adjusting plates or shims 14 and 15, respectively, for the axial retaining brackets 11 and the support brackets 10 as well as for the tangentially extending stop members 12 shown in FIG. 1.

As can readily be seen in the figures of the drawing, the cover structure 1 is suspended in the wall 16 of the reactor chamber by a tie rod 17 whereas the cover construction 1 on the reactor chamber wall 16 is supported solely on and by a wall 18 of the reactor chamber and is instead held down by tie rods 19. Consequently, all horizontal forces and moments of forces are absorbed by the continuous wall plates between which the cover is clamped.

The gap of the opening 2 located between the pressure vessel 3 and the cover structure 1 can furthermore be sealed by expansion bellows 20, which prevent penetration of water into the clearance space 21 between the pressure vessel 3 and the biological shield 7 when fuel elements are exchanged and the reactor chamber is flushed out.

Moreover, it is advantageous, as can be noted especially from FIG. 1, to fill in the individual boxes or compartments of the cover structure 1 with shielding concrete 22 and to close up the annular gap between the cover structure 1 and the pressure vessel 3 with shielding brickwork 23 in the region between the individual brackets 11.

By means of the aforedescribed support and suspension system for the pressure vessel in a steel cover structure of a reactor chamber, all forces produced during operation of the reactor or as a result of mishaps or accidents are reliably absorbed and diverted by the surrounding walls without any danger of displacement or shifting of the reactor vessel. In addition, considerable simplification in the assembly of the pressure vessel is provided by the invention of this application, the improved accessibility of coolant lines for welding thereto the non-illustrated pipelines of the reactor being of special significance.

We claim:

1. A device for supporting a reactor pressure vessel comprising a reactor pressure vessel, means defining a reactor chamber for said pressure vessel, a cover disposed over said reactor chamber, said cover having an opening through which said reactor pressure vessel extends unto said reactor chamber, said cover being a compartmentalized steel structure, means securing said steel structure to said means defining said reactor chamber, support paws extending from the outer surface of said reactor pressure vessel, support brackets extending from said cover and forming a structural entity therewith, said support paws being supported on said support brackets whereby the weight of the reactor pressure vessel is carried by said support paws and said support brackets, and additional brackets disposed above said support paws in the opening formed in said cover, said additional brackets having stop members at the underside thereof for limiting movement in the pressure vessel in an upward direction, said additional brackets being secured to said cover.

2. Device according to claim 1 including stop members mounted on said support brackets for limiting movement of said support paws tangentially to the surface of the pressure vessel.

3. Device according to claim 1 including shim plates insertable between said support paws and said brackets for accurately adjusting the position of the pressure vessel at said brackets.

4. Device according to claim 1 wherein said reactor pressure vessel has coolant lines, said support paws being located at a level of the pressure vessel at which said coolant lines are connected thereto, said support paws being respectively disposed at the peripheral surface of the pressure vessel between the coolant lines.

5. Device according to claim 1 wherein said means defining a reactor chamber comprises a building structure having four walls defining a chamber in which said reactor pressure vessel is installed, and including tie rods in three of said walls connected to said cover for suspending the latter, said cover being supported from below at said fourth wall, and a tie rod in said fourth wall connected to said cover for holding the same down.

* * * * *